H. F. VON ENGELN.
WHEAT STACKER.
APPLICATION FILED JUNE 1, 1918.
1,336,005.
Patented Apr. 6, 1920.
4 SHEETS—SHEET 1.
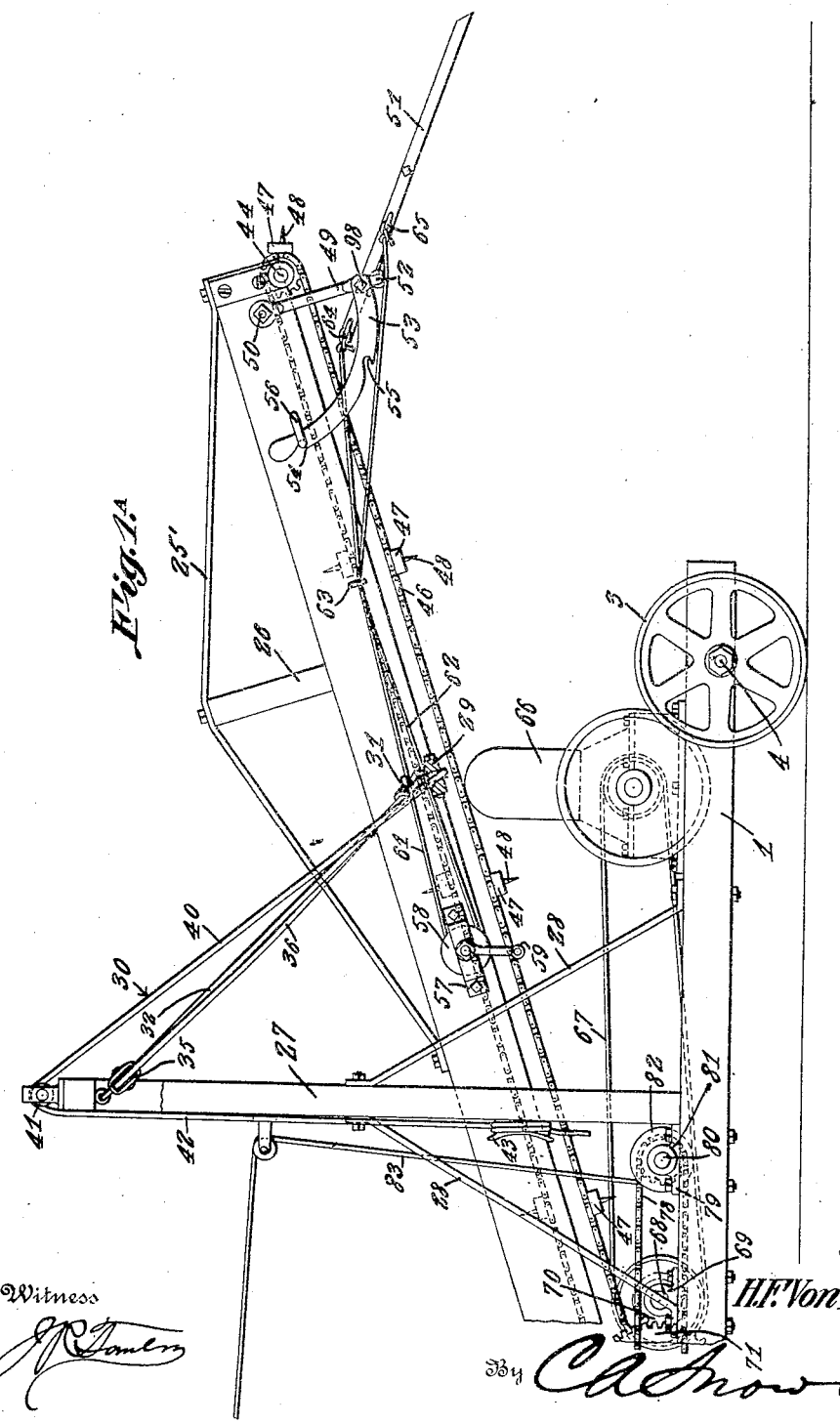
Witness
Inventor
H. F. Von Engeln,
By C. A. Snow & Co.
Attorneys

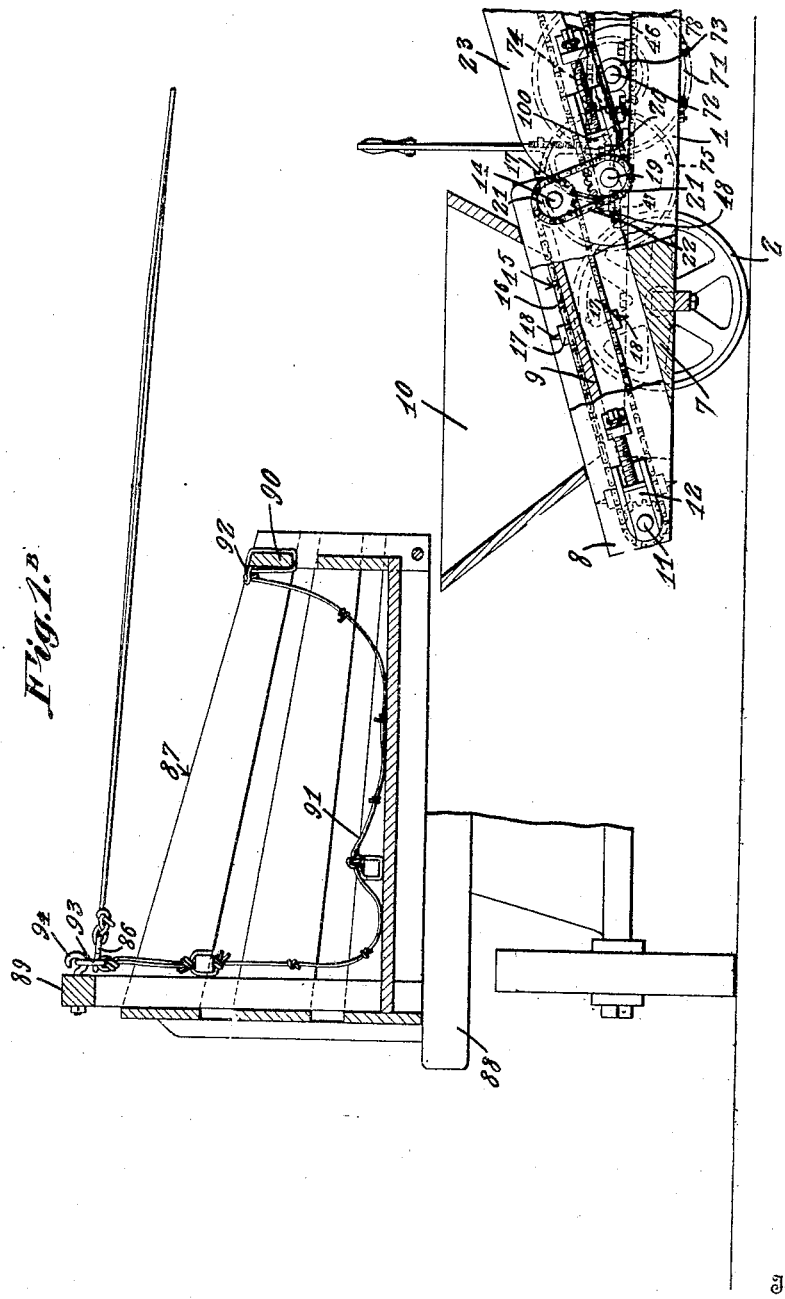

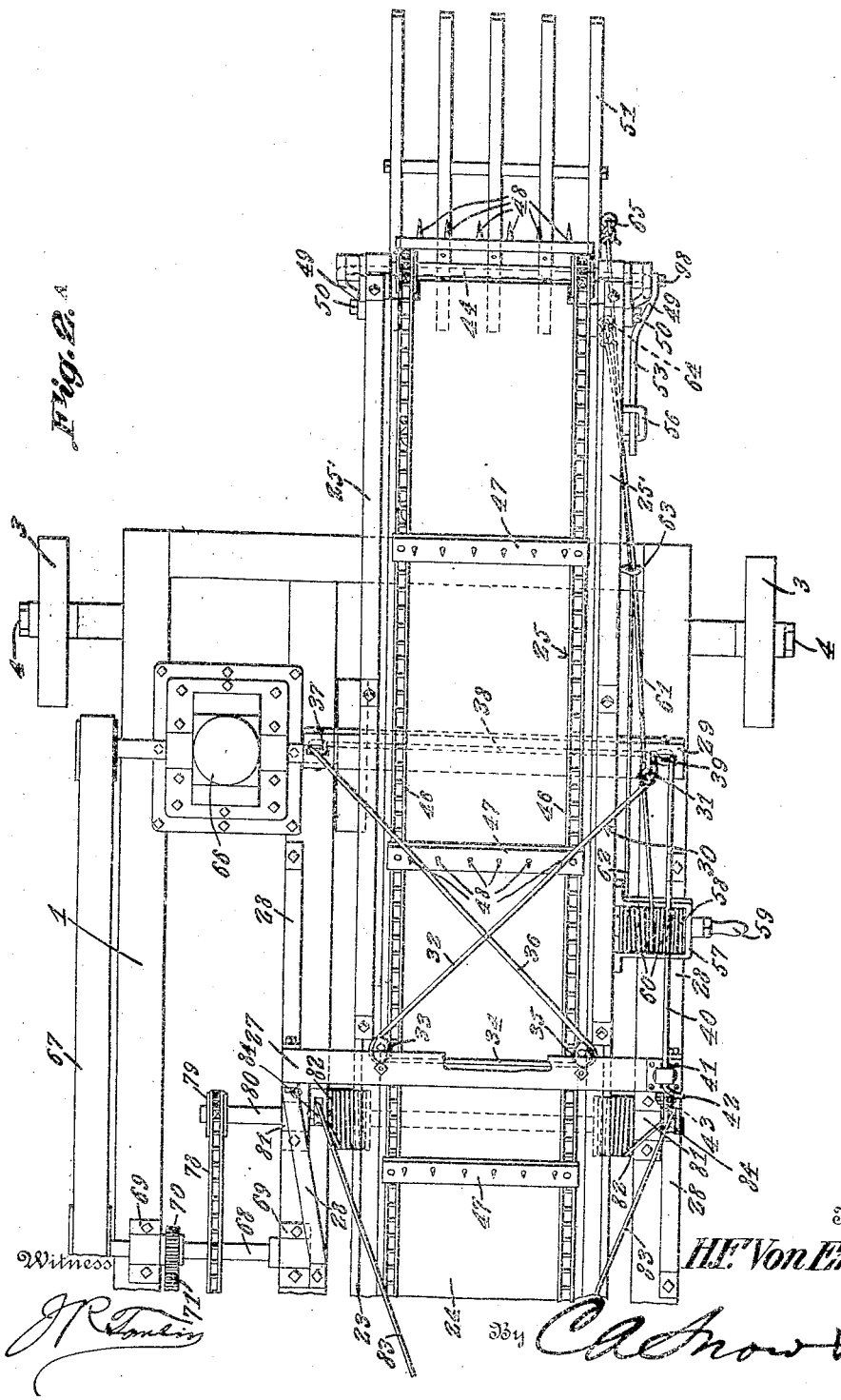

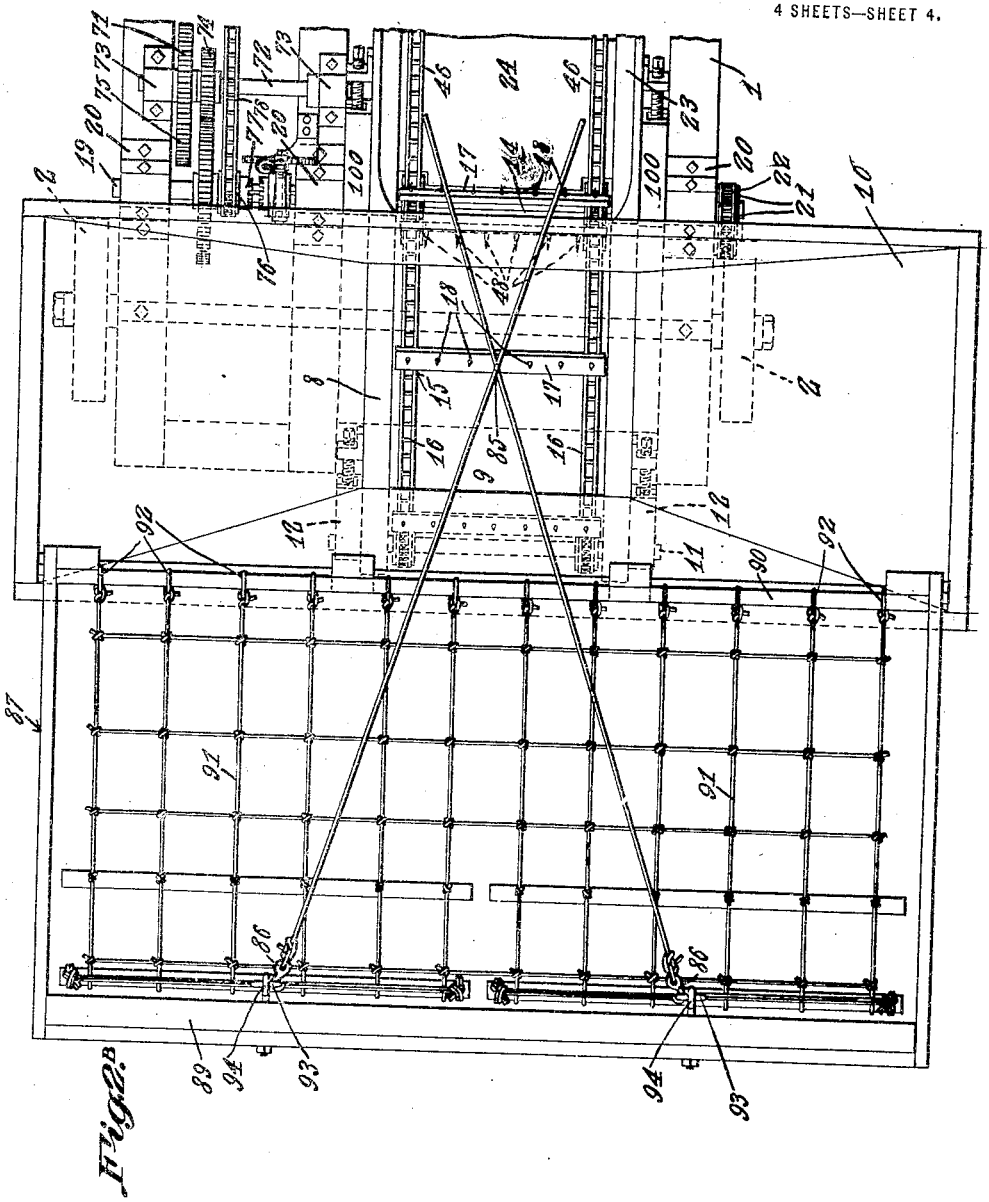

UNITED STATES PATENT OFFICE.

HARRY F. VON ENGELN, OF LUDELL, KANSAS.

WHEAT-STACKER.

1,336,005.  Specification of Letters Patent.  Patented Apr. 6, 1920.

Application filed June 1, 1918. Serial No. 237,741.

*To all whom it may concern:*

Be it known that I, HARRY F. VON ENGELN, a citizen of the United States, residing at Ludell, in the county of Rawlins and State of Kansas, have invented a new and useful Wheat-Stacker, of which the following is a specification.

The device forming the subject matter of this application is a stacker adapted to handle straw from a header, and for other purposes. One object of the invention is to provide novel means for dumping the load out of the header box upon the conveyer mechanism. The invention aims to supply novel means whereby the various movable parts of the structure are operated and controlled. But one form of the invention is shown, and it is to be understood that many changes, falling within the skill of a mechanic, and comprehended by the claims, may be made without departing from the spirit of the invention, or jeopardizing the utility of the device hereinafter described.

In the drawings:—Figure 1ᴬ is a side elevation showing one end of the structure; Fig. 1ᴮ is a side elevation, supplemental to Fig. 1ᴬ, and showing the other end of the structure; Fig. 2ᴬ is a top plan showing that part of the device which appears in Fig. 1ᴬ; Fig. 2ᴮ is a top plan supplemental to Fig. 2ᴬ and showing that part of the machine which is depicted in Fig. 1ᴮ.

In carrying out the invention, there is provided a support in the form of a truck, including a main frame 1 which need not be described in detail because it may be constructed as desired. The frame 1 is supported upon rear ground wheels 2 and upon forward ground wheels 3 which may be arranged and controlled as is found to be expedient.

The rear end of the frame 1 carries a cross beam 7 to which is secured an auxiliary conveyer frame 8 including a bottom 9. A hopper 10 is secured to the conveyer frame 8. A shaft 11 is located at the rear end of the conveyer frame 8 and is carried by adjustable bearings 12 so that that conveyer with which the shaft coöperates may be tightened. A shaft 14 is journaled in the forward end of the conveyer frame 8. A belt conveyer 15 coöperates with the shafts 14 and 11 and moves along the bottom 9 of the conveyer frame 8. The conveyer 15 includes sprocket chains 16, slats 17 connecting the chains, and spurs 18 mounted on the slats. The hopper 10 discharges upon the conveyer 15.

A drive shaft 19 is journaled in bearings 20 on the frame 1 and there are sprocket wheels 21 on the shafts 19 and 14, the sprocket wheels being connected by a chain 22. The numeral 23 marks a main conveyer frame including a bottom 24. Adjustable bearings 100 are mounted on the rear end of the conveyer frame 23 and receive the drive shaft 19, the construction being such that the frame 23 may swing vertically upon the shaft, the bearings being adjustable in order that a main conveyer 25 coöperating with the frame 23 and hereinafter described, may be tightened. Adjacent its forward end, that frame 23 is reinforced by trusses 25 and struts 26.

A supplemental frame 27 is fixed to the main frame 1, and within the member 27, the conveyer frame 23 may swing vertically, the frame 27 being sustained from the main frame 1 by means of braces 28. The main conveyer frame 23 includes a cross piece 29. The numeral 30 denotes a flexible element made fast at one end to the cross piece 29 as shown at 31. Thence, the flexible element leads diagonally, as at 32, to a pulley 33 on the upstanding frame 27, the flexible element being prolonged horizontally around a pulley 35 on the frame 27, and thence being extended diagonally as shown at 36, around a sheave 37 on one end of the cross piece 29. From the sheave 37, the flexible element extends as shown at 38 in dotted line in Fig. 2ᴬ around a sheave 39 on the other end of the cross piece 29, the flexible element passing thence as shown at 40 to a sheave 41 on the top of the frame 27, the free end of the flexible element, denoted by the numeral 42, being belayed to a cleat 43 on the frame 27. It will be obvious that by means of the flexible element 30, the forward end of the main conveyer frame 23 may be swung upwardly or downwardly, the conveyer frame pivoting on the shaft 19. It is not necessary that the flexible element 30 be arranged as described, and, indeed, some other means may be used for swinging the main conveyer frame 23 vertically. A shaft 44 is journaled in the forward end of the frame 23 and about the shaft 44 and the drive shaft 19 is trained a main conveyer 45, coöperating with the bottom 24 of the frame 23 and driven by the shaft 19. The conveyer 45 includes chains 46, slats 47, and spurs 48 carried by the slats. The conveyer 15 of the frame 8 discharges upon the lower end of the conveyer 45.

Hangers 49 are pivoted at 50 to the forward end of the frame 23 as shown in Fig. 1A. A chute 51 of any desired form is disposed between the hangers 49 and is pivoted between its ends as shown at 51 upon the lower ends of the hangers. A brace 53 is mounted to swing on a pivot member 98 carried by one of the hangers 49, the brace having an upper seat 54 and a lower seat 55, adapted to be engaged one at a time with a keeper 56 on the frame 23. A bracket 57 is carried by the frame 23 at some distance from the forward end of the frame 23, and in the bracket, a drum 58 is journaled, the drum being controlled by a crank 59. Flexible elements are engaged with the drum as shown at 60, the flexible elements being denoted by the numerals 61 and 62, and being trained through a fairleader 63 on the frame 23. The flexible element 61 is connected at 64 with the upper end of the chute 51, the flexible element 62 being connected at 65 with the lower portion of the chute. In other words, the flexible elements 61 and 62 are attached to the chute 51 on opposite sides of the pivotal mounting 52 of the chute 51.

An engine 66 is mounted on the frame 1 and may be connected by means of a belt 67 with a counter shaft 68 journaled in bearings 69 on the frame 1. The shaft 68 carries a pinion 70 meshing into a larger gear wheel 71 on a counter shaft 72 journaled in bearings 73 on the frame 1. There is a pinion 74 on the shaft 72 which meshes into a larger gear wheel on the shaft 19 and it will now be obvious that the shaft 19 is driven from the engine 66 by a reducing train comprising the pinion 70, the gear wheel 71, the pinion 74 and the gear wheel 75. It will of course be understood that the engine 66 may be located as desired and that any suitable means may be used for connecting the engine with the shaft 19.

A sprocket wheel 76 is loose on the shaft 19 but may be connected thereto through the medium of a clutch 77. A sprocket chain 78 engages the sprocket wheel 76 and coacts with a sprocket wheel 79 fixed to a winding shaft 80 journaled in bearings 81 on the main frame 1, the winding shaft being provided with drums 82 controlling flexible elements 83 carried upwardly around sheaves 84 on the upstanding frame 27. From the sheaves 84, the flexible elements 83 extend rearwardly as shown in Fig. 1B, the rearwardly extended parts of the flexible elements being crossed on each other as shown at 85 in Fig. 2B. There are hooks 86 on the rear extremities of the flexible elements 83.

The numeral 87 marks a header box which may be mounted on a wagon 88, shown diagrammatically in Fig. 1B, the box including a high side 89 and a low side 90. Flexible slings 91 are provided, the slings being attached as shown at 92 to the low side 90 of the header box 87. The slings 91 lie on the bottom of the header box and are provided with rings 93 adapted to be mounted removably on hooks 94 carried by the high side 89 of the header box. The hooks 86 on the rear ends of the flexible elements 83 may be engaged with the rings 93 on the slings 91.

In practical operation, the slings 91 are arranged as shown in Fig. 1B and the load is dumped into the header box 87 on top of them. The wagon 88 is brought up alongside of the hopper 10. The hooks 86 on the flexible elements 83 are engaged with the rings 93 of the slings 91, the rings being cast off from the hooks 94 on the header box 87. The engine 66 drives the shaft 19 by the mechanism hereinbefore described in detail, and if the sprocket wheel 76 is coupled to the shaft 10 by the clutch 77, the sprocket chain 78 will drive the winding shaft 80 and the drums 82 by way of the sprocket wheels 79. The flexible elements 83 will be reeled on the drums 82 and will ride over the sheaves 84 on the frame 27. The flexible elements 83 will haul the slings 91 to the right (Fig. 1B) and dump the load into the hopper 10. Because the flexible elements 83 are crossed at 85, they tend to pull the slings 91 toward the longitudinal center of the machine, so that the slings do not catch on the ends of the header box 87.

The load, having been deposited in the hopper 10, is carried by the conveyer 15 to the main conveyer 45, the latter delivering the material upon the chute 51, from which the material slides onto the stack. The angle of the chute 51 with respect to the horizontal may be varied by rotating the drum 58 through the instrumentality of the crank 59, one of the flexible elements 61 and 62 being reeled upon the drum, and the other flexible element being paid off the drum, the chute 51 being tilted on the hangers 49. Since the drum 58 is at considerable distance from the chute 51, the operator who is standing on the ground may manipulate the chute, thereby relieving the person who is on the stack. It is possible to disengage the seat 54 of the brace 53 from the keeper 56, to engage the seat 55 with the keeper, to haul in the flexible element 62 and to pay out the flexible element 61, the hangers 49 swinging rearwardly, and the lower end of the chute swinging rearwardly, the chute being thus disposed in an out-of-the-way position beneath the frame 23.

The shaft 19 is driven by the engine 66, the shaft operating the main conveyer 45 and operating the conveyer 15 by means of the sprocket chain 22. The sprocket wheel 76 is disconnected from the shaft 19 by means of the clutch 77.

I claim:—

1. In a device of the class described, a support; a main conveyer frame pivoted at one end to the support for vertical swinging adjustment; a main conveyer traversing the main conveyer frame; mechanism for driving the main conveyer; a header box spaced from the main conveyer frame; a sling attached at one end to the box; mechanism for operating the sling to cause the same to discharge its load; means for coupling said mechanisms together at the will of an operator; and an auxiliary conveyer operating on the support in a fixed relation to the horizontal, the auxiliary conveyer receiving material from the sling and distributing the material on the main conveyer in the various adjusted positions of the latter.

2. In a device of the class described, a support; a shaft journaled on the support; a main conveyer frame pivotally supported on the shaft for vertical swinging adjustment; a main conveyer traversing the main conveyer frame and driven by the shaft; a header box spaced from the main conveyer frame; a sling attached at one end to the box; an auxiliary conveyer operating on the support in a fixed relation to the horizontal, the auxiliary conveyer receiving material from the sling and distributing the material on the main conveyer in the various adjusted positions of the latter; means for driving the auxiliary conveyer from the first shaft; mechanism for actuating the sling to cause the same to discharge its load; a clutch connecting said mechanism with the shaft; an engine on the support; and means for operatively connecting the engine with the shaft; said means including a single reducing train serving to decrease the speed of the auxiliary conveyer and the speed of the mechanism for actuating the sling.

In testimony that I claim the foregoing as my own, I have hereto affixed my signature in the presence of two witnesses.

HARRY F. VON ENGELN.

Witnesses:
   J. C. VON ENGELN,
   H. F. DUNKER.